Patented Aug. 20, 1935

2,012,233

UNITED STATES PATENT OFFICE 2,012,233

PURIFICATION OF 1-N-METHYL-4-BROMO-ANTHRAPYRIDONE

Henry R. Lee, South Milwaukee, and Edwin C. Buxbaum, Shorewood, Wis., assignors to E. I. du Pont de Nemours & Company, Wilmington, Del., a corporation of Delaware No Drawing. Application October 22, 1934, Serial No. 749,479

6 Claims. (Cl. 260—42)

This invention relates to the preparation of 1-N-methyl-4-bromo-anthrapyridone and more particularly to the purification of this product and the separation therefrom of those impurities which in the subsequent condensation with the arylamines produce blue color bodies.

In the preparation of 1-N-methyl-4-bromo-anthrapyridone there is generally present in the resulting product some 1-methyl-amino-4-bromo-anthraquinone. While the condensation of 1-N-methyl-4-bromo-anthrapyridone with an arylamine, such as para-toluidine, and sulfonation of the resulting color base produces red wool dyestuffs, the condensation of the same arylamine with 1-methyl-amino-4-bromo-anthraquinone produces a bright blue dyestuff. Even very small amounts of 1-methylamino-4-bromo-anthraquinone as an impurity in the 1-N-methyl-4-bromo-anthrapyridone consequently give a final dyestuff which is materially bluer in shade than pure 1-N-methyl-4-para-toluido-anthrapyridone sulfo acid.

It is therefore an object of our invention to provide a process for purifying 1-N-methyl-4-bromo-anthrapyridone and for eliminating substantially all of those undesirable impurities which tend to alter the shade of the final dyestuff to be prepared therefrom.

We have found that the crude 1-N-methyl-4-bromo-anthrapyridone may be dissolved in concentrated sulfuric acid and precipitated therefrom by carefully diluting with water or dilute acid to an acid concentration of from 70 to 80%, while the undesirable impurities remain dissolved in the acid solution. This method is particularly suitable for use in conjunction with the purification of the crude 1-N-methyl-4-bromo-anthrapyridone by the nitrite treatment, which is disclosed more fully in copending application Ser. No. 749,477, and illustrated in the following examples.

The following examples are given to more fully illustrate our invention. Parts used are by weight.

Example 1

50 parts of crude 1-N-methyl-4-bromo-anthrapyridone are dissolved in 500 parts of 93% sulfuric acid. When solution is complete, after about one hour, 95 parts of water are slowly added over one hour, care being taken that the temperature does not rise over 80° C. After the addition of the water is completed, the mass is stirred at room temperature for eight to twelve hours more. The acid suspension is then filtered and washed with 100 parts of 60° Bé. sulfuric acid and sludged in 500 parts of hot water. The precipitate is filtered, washed acid free and dried.

Example 2

15 parts of sodium nitrite are added to 500 parts of 93% sulfuric acid at a temperature below 30° C. with good agitation. 100 parts of crude 1-N-methyl-4-bromo-anthrapyridone are then added to the acid solution and the mixture heated to 80° C. over a period of one-half hour and held at 80–82° C. for a period of about three hours. 96 parts of water are then added slowly, maintaining the temperature at 90° C. When all the water has been added, the mass is cooled to room temperature and agitated at this temperature for several hours, filtered at 20° to 30° and washed with 100 parts of 78% sulfuric acid, sucked dry and sludged in 1,000 parts of hot water. The yellow precipitate is filtered off, washed acid free and dried at 100° C.

Example 3

150 parts of a 5% solution of nitrosyl sulfuric acid are mixed with 100 parts of 93% sulfuric acid. 50 parts of crude 1-N-methyl-4-bromo-anthrapyridone are added at 30° C. and the reaction mass heated to 75° C. over a period of one-half hour. The temperature is held at 75° for four hours. 100 parts of water are added slowly over a period of one hour at a temperature of 80° C. The mass is cooled to 30° C. and held for eight hours. The precipitate is filtered off, washed with 50 parts of 70% sulfuric acid, sucked dry and sludged in 2,500 parts of hot water. The purified 1-N-methyl-4-bromo-anthrapyridone is filtered, washed acid free and dried.

While in the above examples we have described the dissolving of the anthrapyridone compound in 93% acid and the precipitation from an acid solution of about 78%, the separation may also be effected by heating a finely dispersed crude anthrapyridone in 78% acid, cooling the suspension to room temperatures and filtering. The concentration of sulfuric acid at the time of filtration may vary between 70 and 80%, although the use of about 78% acid is preferred. The mass may be filtered at temperatures somewhat higher or lower than those given in the specific examples, depending on the particular acid concentration used. Temperatures from 20° to 30°, however, are preferred. While concentrated sulfuric acid of above 93% may be used to effect the solution of the anthrapyridone compound, care must be exercised in the use of the more concentrated acids to avoid sulfonation of the anthrapyridone compound. The quantity of acid used may vary within wide limits. The use of from 4 to 20 parts of acid per part of the 1-N-methyl-4-bromo-anthrapyridone has been found to give satisfactory results.

The corresponding 1-N-methyl-4-chloro-anthrapyridone compound may be prepared in a similar manner to that described above.

What we claim is:

1. In the preparation of 1-N-methyl-4-halogen-anthrapyridone, the step which comprises precipitating the 1-N-methyl-4-halogen-anthrapyridone from a sulfuric acid solution by bringing the concentration of the acid to about 70 to 80%.

2. In the preparation of 1-N-methyl-4-halogen-anthrapyridone, the steps which comprise precipitating 1-N-methyl-4-halogen-anthrapyridone from a sulfuric acid solution by bringing the concentration of the acid to about 70 to 80% and separating the precipitate from the solution at a temperature of from 20 to 30° C.

3. In the preparation of 1-N-methyl-4-bromo-anthrapyridone, the step which comprises precipitating the 1-N-methyl-4-bromo-anthrapyridone from a sulfuric acid solution by bringing the concentration of the acid to about 70 to 80%.

4. In the preparation of 1-N-methyl-4-bromo-anthrapyridone, the steps which comprise precipitating 1-N-methyl-4-bromo-anthrapyridone from a sulfuric acid solution by bringing the concentration of the acid to about 70 to 80% and separating the precipitate from the solution at a temperature of from 20 to 30° C.

5. In the preparation of 1-N-methyl-4-bromo-anthrapyridone, the steps which comprise precipitating 1-N-methyl-4-bromo-anthrapyridone from a sulfuric acid solution by bringing the concentration of the acid to approximately 78% and separating the precipitate from the solution at room temperature.

6. In the preparation of 1-N-methyl-4-bromo-anthrapyridone wherein the resulting crude product is treated with nitrous acid in a sulfuric acid solution, the steps which comprise bringing the concentration of the acid to about 70 to 80% to precipitate the 1-N-methyl-4-bromo-anthrapyridone, and separating it from the solution at 20 to 30° C.

HENRY R. LEE.
EDWIN C. BUXBAUM.